(12) United States Patent
Xu et al.

(10) Patent No.: US 12,083,594 B2
(45) Date of Patent: Sep. 10, 2024

(54) MULTI-SOURCE SELF-ADAPTIVE LOW-STRESS ADDITIVE MANUFACTURING METHOD

(71) Applicant: BEIJING INSTITUTE OF TECHNOLOGY, Beijing (CN)

(72) Inventors: Chunguang Xu, Beijing (CN); Wenjun Zhang, Beijing (CN); Wenkai Li, Beijing (CN); Bo Yang, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 0 days.

(21) Appl. No.: 18/353,166

(22) Filed: Jul. 17, 2023

(65) Prior Publication Data

US 2024/0033825 A1 Feb. 1, 2024

(30) Foreign Application Priority Data

Jul. 28, 2022 (CN) .......................... 202210901674.3

(51) Int. Cl.
*B22F 10/30* (2021.01)
*B22F 10/28* (2021.01)
(Continued)

(52) U.S. Cl.
CPC .............. *B22F 10/30* (2021.01); *B22F 10/28* (2021.01); *B22F 12/90* (2021.01); *B33Y 10/00* (2014.12); *B33Y 50/02* (2014.12)

(58) Field of Classification Search
CPC .......... B22F 10/30; B22F 10/28; B22F 12/90; B22F 10/20; B22F 10/25; B22F 10/36;
(Continued)

(56) References Cited

U.S. PATENT DOCUMENTS

2019/0015901 A1* 1/2019 Haberland ............. G01N 29/22

FOREIGN PATENT DOCUMENTS

CN 107225244 A 10/2017
CN 109175364 A 1/2019
(Continued)

OTHER PUBLICATIONS

Yin, Jie, et al. "Dual-beam laser-matter interaction at overlap region during multi-laser powder bed fusion manufacturing." Additive Manufacturing 46 (2021): 102178. (Year: 2021).*

*Primary Examiner* — Brian W Jennison
*Assistant Examiner* — Kristina J Babinski
(74) *Attorney, Agent, or Firm* — John A. Miller; Shumaker, Loop & Kendrick, LLP

(57) ABSTRACT

A multi-source self-adaptive low-stress additive manufacturing method that includes arranging one or more high-energy sound beam excitation units on an additive manufacturing platform according to a size and a structure of a metal workpiece; planning an additive path according to the size and the structure of the workpiece; fixing a substrate on a self-adaptive additive manufacturing workbench; conducting additive manufacturing of the workpiece and starting a high-energy sound beam regulation system synchronously to generate high-energy sound beam(s) that are transmitted to the workpiece according to a control sequence; acquiring position information of molten pool(s) and position information of the one or more high-energy sound beam excitation units in the additive manufacturing process; continuously monitoring a surface temperature of the workpiece; and closing the high-energy sound beam regulation system when the additive manufacturing of the workpiece is finished and the surface temperature of the metal workpiece is reduced to room temperature.

7 Claims, 5 Drawing Sheets

(51) Int. Cl.
*B22F 12/90* (2021.01)
*B33Y 10/00* (2015.01)
*B33Y 50/02* (2015.01)

(58) Field of Classification Search
CPC .......... B22F 10/50; B22F 10/66; B22F 10/68;
B22F 10/85; B33Y 10/00; B33Y 50/02;
B33Y 30/00; Y02P 10/25
See application file for complete search history.

(56) References Cited

FOREIGN PATENT DOCUMENTS

| | | | | | |
|---|---|---|---|---|---|
| CN | 112831650 | A | * | 5/2021 | |
| CN | 113118466 | A | | 7/2021 | |
| CN | 113634763 | A | | 11/2021 | |
| CN | 113909503 | A | | 1/2022 | |
| CN | 114381627 | A | * | 4/2022 | |
| JP | 7038917 | B1 | * | 3/2022 | .............. B22F 12/41 |
| WO | 2020062341 | A1 | | 4/2020 | |

\* cited by examiner

MULTI-SOURCE SELF-ADAPTIVE LOW-STRESS ADDITIVE MANUFACTURING METHOD

CROSS-REFERENCE TO RELATED APPLICATIONS

This application claims priority to China Patent Application Serial No. 202210901674.3 filed Jul. 28, 2022, the entire disclosure of which is herein incorporated by reference.

BACKGROUND

Field

The present disclosure relates to the field of stress control of additive manufacturing, in particular to a multi-source self-adaptive low-stress additive manufacturing method.

Discussion of the Related Art

In recent years, the additive manufacturing technology is developed rapidly. Aluminum alloy and titanium alloy materials are widely applied to the fields of aerospace, aviation, national defense and the like due to excellent mechanical and mechanical properties, and have the characteristics of short processing period and high efficiency. However, these materials have small elastic modulus and low thermal conductivity, and have the problems of violent raw material additive process, complex temperature variation, difficult prediction of molten pool conditions and the like in the additive manufacturing process. As a result of these problems, residual stress concentration in the internal or local areas of the final product leads to deformation and even cracking. To ensure sufficient strength and good reliability of the additive manufactured workpiece, it is necessary to eliminate and homogenize residual stresses that arise from the additive manufacturing process.

The commonly used residual stress reduction method includes a natural aging method, a vibration aging method, a heat treatment method and the like. The natural aging method has low residual stress eliminating efficiency and needs to occupy a large amount of field for a long time. Although the vibration aging method can eliminate residual stress, the method has the limitations that it is difficult to find the resonant frequency between the vibration system and the workpiece, so that the practical application is greatly limited, and the noise of the regulation field is large. The heat treatment method has strict requirements on the process, additional residual stress may be introduced if the treatment such as temperature reduction rate, annealing temperature and the like is improper, and this method has high energy consumption and is not beneficial to environmental protection. For example, patent application No CN 114381627 A discloses a method and device for eliminating stress deformation of large component in electric arc additive manufacturing process, and patent No. CN 107225244 A discloses a method for adjusting/reducing the internal stress of a laser additive manufacturing part. However, the methods and devices described in the above two patent application documents are relatively complex, which requires a large amount of modifications for the arc additive manufacturing system, including the need to be equipped with a special heat treatment furnace and the like, and the manufacturing cost and time cost are relatively high. These methods are more suitable for stress regulation after additive manufacturing is finished due to the limitation of the mechanism of the method, which is that residual stress in a metal workpiece cannot be synchronously and efficiently homogenized and reduced in the additive manufacturing process on the premise of not modifying the additive manufacturing system in a great extent.

SUMMARY

In view of this, the present disclosure proposes a multi-source self-adaptive low-stress additive manufacturing method, which may apply for an additive manufacturing process, and has good effect of reducing and homogenizing residual stress and high efficiency without affecting the general additive manufacturing process. By this method, the residual stress can be eliminated synchronously in the additive manufacturing process to ensure the reliability of the low-stress additive manufacturing process.

Accordingly, the present disclosure provides a multi-source self-adaptive low-stress additive manufacturing method, comprising:

a step of A of formulating an arrangement scheme of a high-energy sound beam excitation unit based on a size and a structure of a metal workpiece to be prepared, and arranging corresponding one or more high-energy sound beam excitation units on an additive manufacturing platform;

a step of B of planning an additive path according to the size and the structure of the metal workpiece; and a step of C of fixing a substrate on a self-adaptive additive manufacturing workbench, and polishing and cleaning the substrate;

a step of D of conducting additive manufacturing of the metal workpiece and starting a high-energy sound beam regulation system synchronously to generate high-energy sound beam(s) which transmitted to the metal workpiece according to a time and/or space control sequence;

a step of E of acquiring position information of molten pool(s) and position information of the one or more high-energy sound beam excitation units in the additive manufacturing process in real time;

a step of F of continuously monitoring a surface temperature of the metal workpiece when the additive manufacturing of the metal workpiece starts; and a step of G of closing the high-energy sound beam regulation system when the additive manufacturing of the metal workpiece is finished and the surface temperature of the metal workpiece is reduced to the room temperature.

In this way, in the additive manufacturing process of the method, the high-energy sound beams are synchronously transmitted to the metal workpiece to be additive manufactured in a lossless manner in time and/or space sequence based on the size and residual tress distribution condition of the metal workpiece, and the enabling condition and power parameters of the high-energy sound beam unit are continuously regulated based on the position and height, ensuring the on-going reduction and homogenization to the residual stress continuously generated in the additive manufacturing process. On one hand, the regulation and excitation of local residual stress induced by high energy sound field is a property of energy transfer from elastic wave-moving particles. By using one or more excitation sources, the focus of multiple high-energy acoustic beams can be realized within a certain range. By means of the action mechanism of high-energy fluctuations on material microstructure, the binding force between metal materials' lattices can be changed, so that the dislocation between lattices can be transitioned from an unstable high-energy state to a stable state. The original energy state between lattices is broken and a new low-energy structure configuration is formed. In this way, the residual stress can be reduced and homogenized. On the other hand, the focusing energy of high-energy sound beams is helpful to eliminate the void and pore defects formed by interlayer holes and element gasification of metal additive workpiece, so that the surface of the regulated metal workpiece is more uniform with less porosity, and the metal work piece has higher strength, thereby realizing the significant improvement of the internal quality and mechanical properties of the metal additive workpiece.

In an embodiment of the present disclosure, a frequency range of high energy sound beam(s) emitted by the one or more high-energy sound beam excitation units in the step A is 5.0-40.0 KHz, and the power of a single high-energy sound beam excitation unit is more than 1.0 W.

The high-energy ultrasonic wave has a characteristic of beam focusing and directing. By effectively adjusting the frequencies of high energy sound beams, such as P-wave, S-wave, surface wave and guided wave, and the energy level in the focusing region, the focusing region of high energy acoustic beams can be controlled in the specified position in the metal workpiece, so as to reduce and homogenize the residual stress.

In an embodiment of the present disclosure, the one or more high-energy sound beam excitation units in the step A further comprises titanium alloy special adiabatic amplitude transformer(s); and wherein the titanium alloy special adiabatic amplitude transformer(s) is ¼ wavelength titanium alloy special adiabatic amplitude transformer(s) or ½ wavelength titanium alloy special adiabatic amplitude transformer(s) in dependence on the size of a space for the additive manufacturing.

The amplitude transformer transmits and focus the high-energy sound beams. Titanium alloy material has low thermal conductivity, which is about ⅕ of iron and ¹/₁₄ of aluminum, so the high heat generated in the material increasing process can be well isolated, ensuring the stability of working performance of the high-energy sound beam excitation unit.

In an embodiment of the present disclosure, the titanium alloy special adiabatic amplitude transformer(s) is kept closely fitted with a side of the substrate on which not occupied by the additive manufacturing process, and heat-resisting sound-transmitting rubber or heat-resisting butter are used for coupling between the titanium alloy special adiabatic amplitude transformer(s) and the side of the substrate.

The titanium alloy special adiabatic amplitude transformer is kept closely fitted with a side of the substrate on which the additive manufacturing is not conducted so that the residual stress continuously generated in the metal part is efficiently and stably eliminated and homogenized in the regulation process. The end face of the titanium alloy special adiabatic amplitude transformer is coated with heat-resisting sound-transmitting rubber or heat-resisting butter, so that the bottom of the workbench and the amplitude transformer are well in contact, which can ensure that the high-energy sound beams are injected into the metal workpiece continuously in a lossless manner in the additive manufacturing process, thereby ensuring the good effect of the regulation.

In an embodiment of the present disclosure, the arrangement scheme of the high-energy sound beam excitation unit in the step A comprises the number and the position of the one or more high-energy sound beam excitation units;

when a diameter of a contact surface of the metal workpiece and the substrate is less than or equal to 100 mm, one high-energy sound beam excitation unit is arranged at an additive position on the additive manufacturing platform;

when the diameter of the contact surface of the metal workpiece and the substrate is larger than 100 mm and the metal workpiece is a box in structure, a plurality of high-energy sound beam excitation units that are arranged in an annular or rectangular array, are arranged at additive positions on the additive manufacturing platform;

when the diameter of the contact surface of the metal workpiece and the substrate is larger than 100 mm and the metal workpiece is a tubular or a frame in structure, a plurality of high-energy sound beam excitation units that are arranged in an annular frame or a rectangular frame according to a shape of the metal workpiece, are arranged at additive positions on the additive manufacturing platform.

The regulation effect of the high-energy sound field on the local residual stress in the metal workpiece depends on the focusing energy of the high-energy sound field, a controllable focusing area, an excitation mode, material characteristics, a coupling state and the like. An excitation strategy based on the structure and size of the metal workpiece may improve the elimination of the residual stress in the metal workpiece.

In an embodiment of the present disclosure, the high-energy sound beam regulation system in the step D further has an automatic shutdown function, and when the surface temperature of the metal workpiece is reduced to room temperature, the automatic shutdown function is turned on and the high-energy sound beam regulation system stops working automatically.

The additive manufacturing process is generally long, depending on the size of the workpiece to be additive manufactured, it takes several hours to dozens of hours. The automatic shutdown function allows the operator to be off duty and prevents degradation of material properties due to over-regulation.

In an embodiment of the present disclosure, the position information of the molten pool(s) in the step E is acquired based on the position information of distal end(s) of welding torch(es).

In this way, because the position(s) of the distal end(s) of the welding torch(es) is the same or similar to the position(s) of the molten pool(s), the real-time position(s) of the molten pool(s) can be obtained indirectly through the position information of the distal end(s) of the welding torch(es).

In an embodiment of the present disclosure, the step E comprises:
calculating a relative distance between the molten pool(s) and the one or more high-energy sound beam excitation units according to the position information of the molten pool(s) and the position information of the one or more high-energy sound beam excitation units; and
regulating and controlling the enabling condition and the power information of the one or more high-energy sound beam excitation units according to the relative distance.

In this way, the relative distance between the molten pool(s) and the high-energy sound beam excitation units can be calculated by the acquired position information of the molten pool(s) and the position information of the high-energy sound beam excitation units, so that the enabling condition and the power range of the high-energy sound beam excitation units can be determined according to the relative distance.

In an embodiment of the present disclosure, the surface temperature of the metal workpiece in the step E is represented by the surface temperature of a side of the substrate on which the additive manufacturing is conducted.

The additive manufacturing process is a process of melting material and stacking by layer under numerical control until a mechanical workpiece with a certain shape is formed. The surface temperature of the metal workpiece cannot be obtained directly, so the surface temperature of the metal workpiece is replaced by the surface temperature of an additive side of the substrate.

In an embodiment of the present disclosure, the method further comprises a step H of: recording and storing an additive manufacturing and regulating scheme when the additive manufacturing process and the regulation process are finished.

In this way, the schemes of additive manufacturing and regulation are recorded and stored, so that the stored schemes can be directly called without reconstructing when additive manufacturing and residual stress regulation are performed on the metal workpiece to be additive manufactured having the same material and size next time.

These and other aspects of the present disclosure will be more readily apparent upon reading of the detailed description of the embodiment(s).

1. industrial personal computer; 2. manipulator controller; 3. multi-axis manipulator; 4. welding torch; 5. welder controller; 6. workpiece to be additive manufactured; 7. self-adaptive additive manufacturing workbench; 8. fan; 9. high-energy sound beam exciter; 10. guide rail; 11. high-energy sound beam generator; 12. vertical plate; 13. substrate; 14. cross plate; 15. fixing screw; 16. fixing screw; 17, titanium alloy special adiabatic amplitude transformer; 18. hexagon socket head screw; 19. spring; 20. T-shaped screw nut; 21. amplitude transformer fixing plate; 22. T-shaped screw; 23. high-energy sound beam excitation unit; 24. T-shaped groove; 25. long circular groove.

It should be appreciated that the size and form of each block diagram in the above-mentioned schematic structural diagrams are for schematic purposes only and shall not constitute an exclusive interpretation of the embodiments of the present disclosure. The relative positions and the inclusion relationships between the blocks shown in the structural schematic diagrams are for schematic purposes only and shall not limit the physical connection manner of the embodiments of the present disclosure.

DETAILED DESCRIPTION OF THE EMBODIMENTS

Further features and advantages of the present disclosure will be more apparent upon reading the following detailed description with the help of the annexed drawings.

Figure 1:
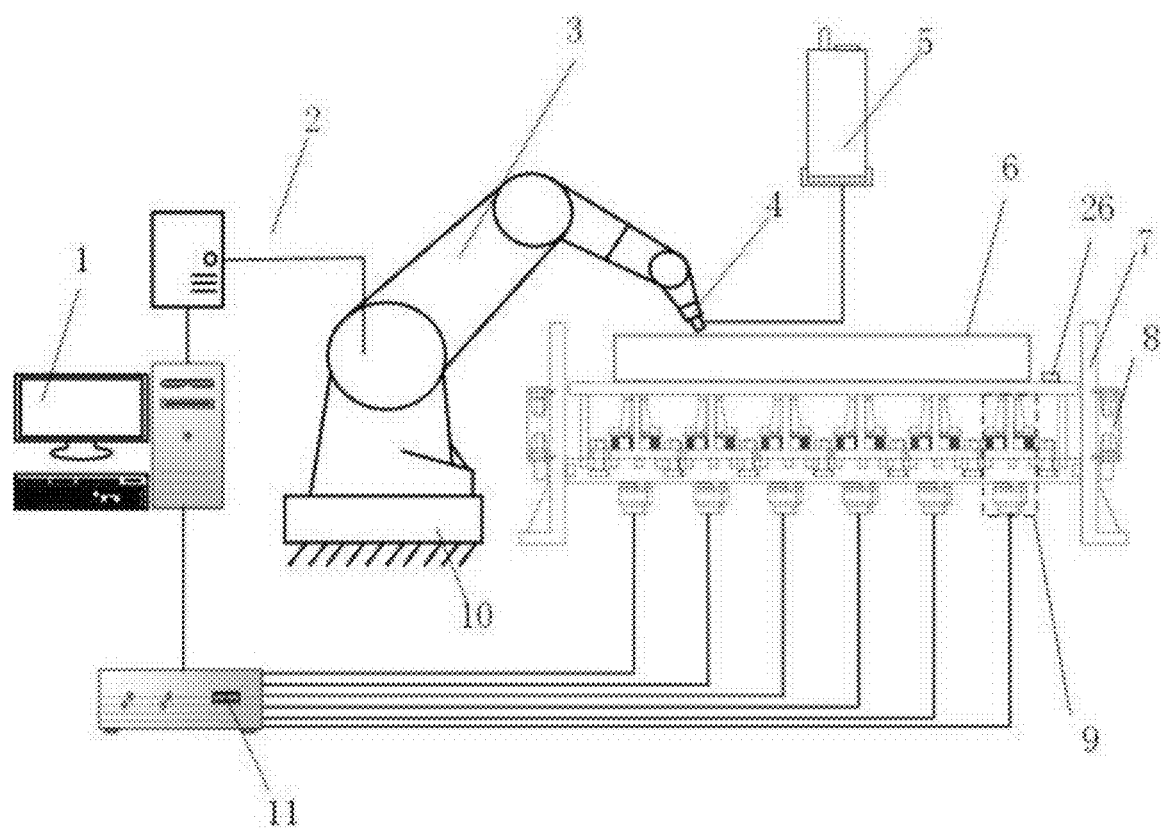
FIG. 1 is a schematic structural diagram of a multi-source self-adaptive low-stress additive manufacturing apparatus according to an embodiment of the present disclosure.

An embodiment of the present disclosure provides a multi-source self-adaptive low-stress additive manufacturing device and a multi-source self-adaptive low-stress additive manufacturing method. The device and the method may apply for an additive manufacturing process have good effect of reducing and homogenizing residual stress and high efficiency without affecting the additive manufacturing. By the device and the method, the residual stress can be eliminated synchronously in the process of additive manufacturing to ensure the reliability of low-stress additive manufacturing process. Referring to FIG. 1, the multi-source self-adaptive low-stress additive manufacturing device according to an embodiment of the present disclosure includes: an industrial personal computer 1, manipulator controller(s) 2, multi-axis manipulator(s) 3, welding torch(es) 4, welder controller(s) 5, a metal workpiece 6 to be additive manufactured, a self-adaptive additive manufacturing workbench 7, fans 8, high-energy sound beam exciter(s) 9, a guide rail 10, a high-energy sound beam generator) 1, vertical plates 12, an substrate 13, a cross plate 14, fixing screws 15, fixing screws 16, titanium alloy special adiabatic amplitude transformer(s) 17, hexagon socket head screws 18, springs 19, T-shaped screw nuts 20, amplitude transformer fixing plate(s) 21, T-shaped screws 22, and high-energy sound beam excitation unit(s) 23.

The workpiece 6 to be additive manufactured is fixedly mounted on the self-adaptive additive manufacturing workbench 7. The base(s) of the multi-axis manipulator(s) 3 is connected with the guide rail 10 in a slidable manner. The welding torch(es) 4 is held by the distal end(s) of the multi-axis manipulator(s) 3. The manipulator controller(s) 2 is electrically connected with the multi-axis manipulator(s) 3, and the welding torch(es) 4 is electrically connected with the welder controller(s) 5. The multi-axis manipulator(s) 3 is controlled by the manipulator controller(s) 2 to move the welding torch(es) 4 to conduct low-stress additive manufacturing on the metal workpiece 6 to be additive manufactured.

The top portion(s) of the high-energy sound beam excitation unit(s) 23 and the bottom portions of the titanium alloy special adiabatic amplitude transformer(s) 17 are connected and fixed via coaxial screw rods, and the titanium alloy special adiabatic amplitude transformer(s) 17 then abuts against a side of the substrate 13 on which the additive manufacturing is not conducted. The high-energy sound beam generator 11 is electrically connected with the high-energy sound beam excitation unit(s) 23 to drive the high-energy sound beam excitation unit(s) 23 to emit the high-energy sound beam(s). The emitted high-energy sound beam(s) transmits into the self-adaptive additive manufacturing workbench 7 via the titanium alloy special adiabatic amplitude transformer(s) 17, in order to achieve real-time regulation of residual stress generated in the additive manufacturing process of the metal workpiece 6 to be additive manufactured.

The industrial personal computer 1 is electrically connected with the welder controller(s) 5, the high-energy sound beam excitation unit(s) 23, the manipulator controller(s) 2 and a temperature detection device 26, respectively, controls the states of the manipulator(s) and the high-energy sound beam generator in real time, and adjusts the state of the high-energy sound beam generator in real time by taking position information of the distal end(s) of the welding torch(es) as feedback, so as to monitor and control the additive manufacturing process of the metal workpiece 6 to be additive manufactured, the regulation process of residual stress of the metal workpiece 6 to be additive manufactured, and the surface temperature of the metal workpiece 6 to be additive manufactured.

The titanium alloy special adiabatic amplitude transformer(s) 17 is in direct contact with the bottom of the self-adaptive additive manufacturing workbench 7. High temperature generated in the additive manufacturing process is directly transferred to the titanium alloy special adiabatic amplitude transformer(s) 17 through the bottom plate of the workbench, and the material for the titanium alloy special adiabatic amplitude transformer(s) 17 is thus required to be resistant to high temperature and capable of normally transmitting high-energy sound beam energy in a high-temperature environment to reduce loss of the high-energy sound beam(s). The top portion(s) of the titanium alloy special adiabatic amplitude transformer(s) 17 abuts against the bottom portion of the self-adaptive additive manufacturing workbench 7, and is coated uniformly with a coupling agent, such as heat-resisting sound-transmitting rubber or heat-resisting butter, so that the base of the self-adaptive additive manufacturing workbench 7 is in well contact with the titanium alloy special adiabatic amplitude transformer(s) 17, ensuring that there is no relative displacement within the whole device in the regulation process, the energy loss of high-energy sound beams transmitted to the base of the workbench from the top portion(s) of the titanium alloy special adiabatic amplitude transformer(s) 17 is reduced, and the regulation effect is ensured.

Figure 2:
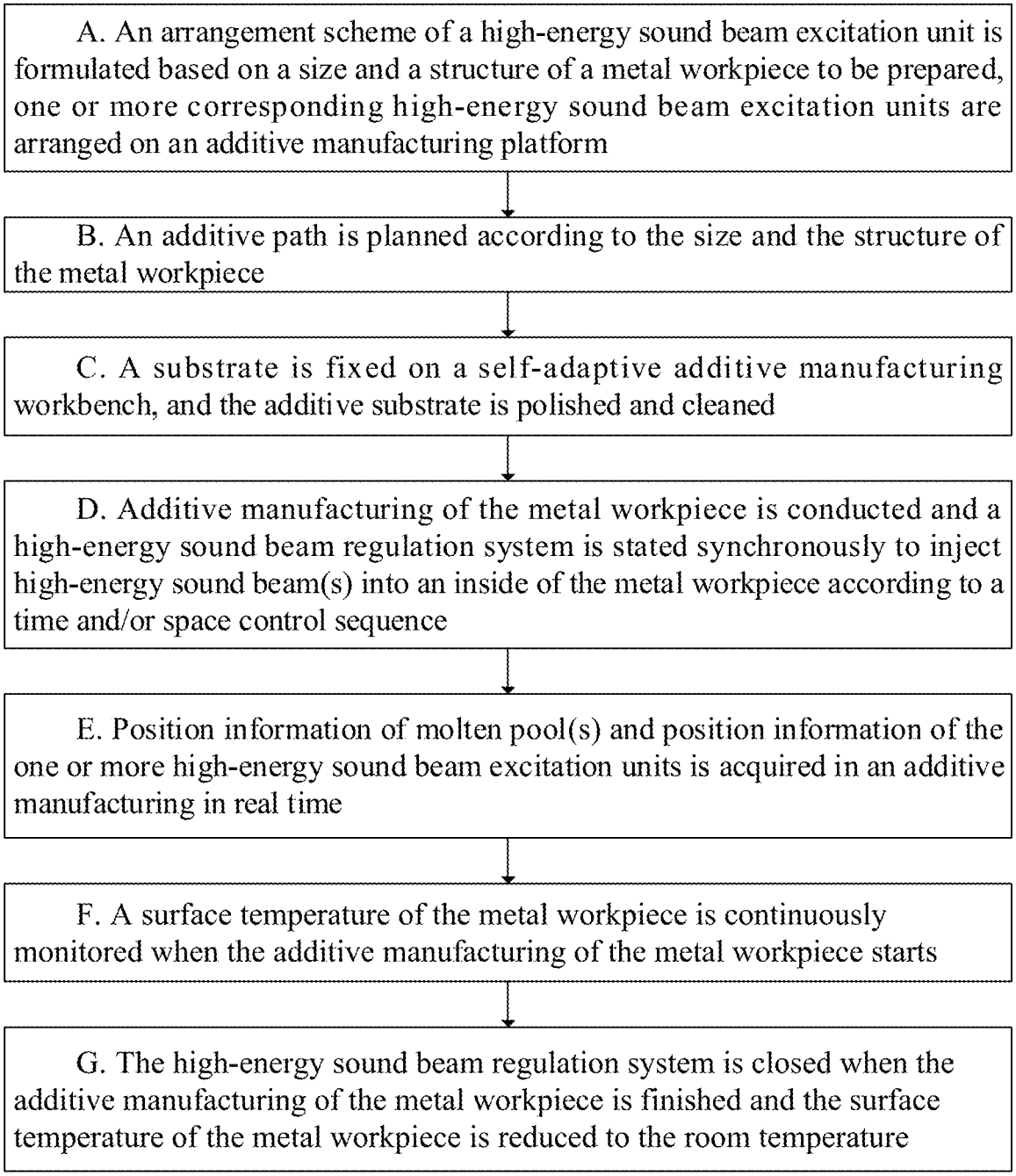
FIG. 2 is a flowchart of a multi-source self-adaptive low-stress additive manufacturing method according to an embodiment of the present disclosure.
Figure 3:
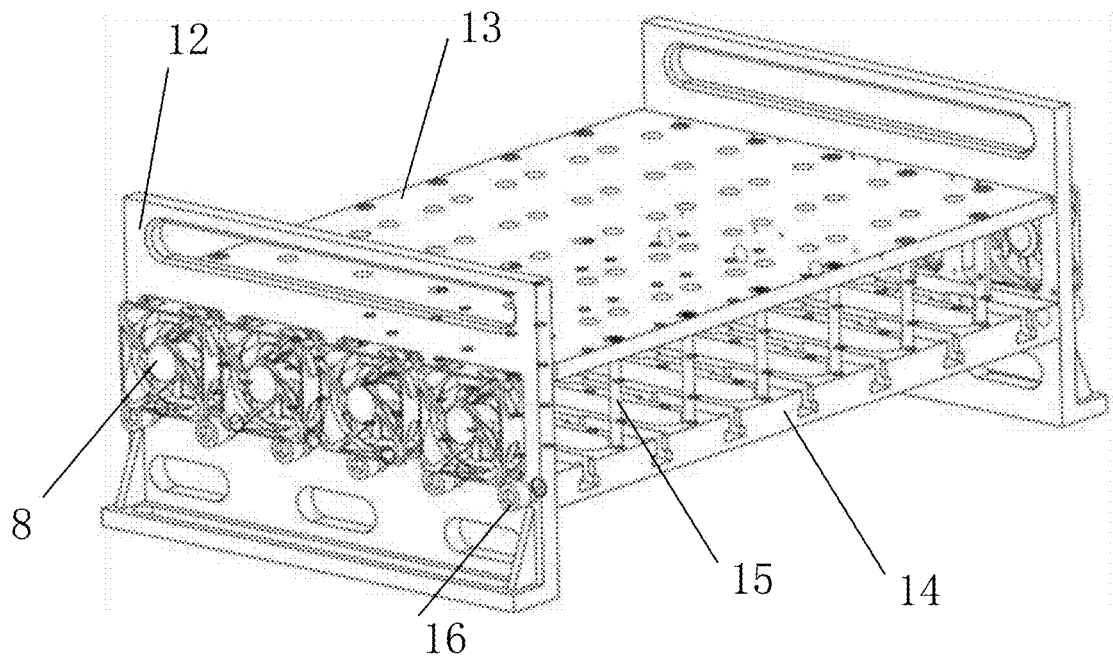
FIG. 3 is a schematic structural diagram of a self-adaptive additive manufacturing workbench according to an embodiment of the present disclosure.
Figure 4:
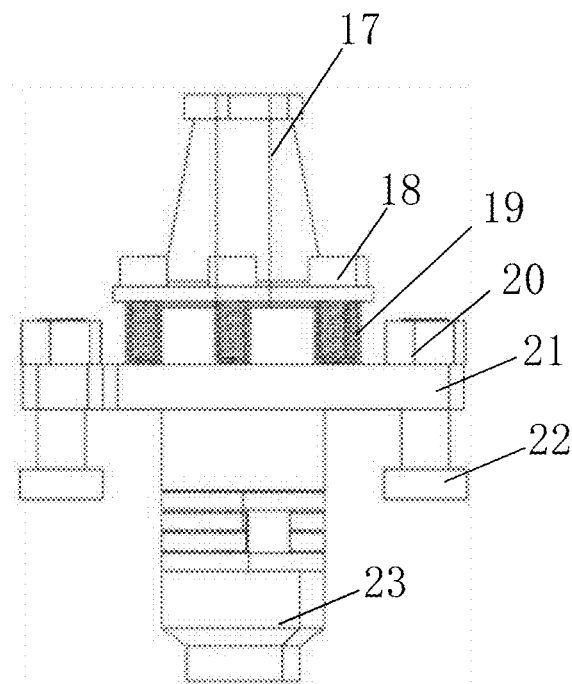
FIG. 4 is a schematic structural diagram of a high-energy sound beam excitation unit according to an embodiment of the present disclosure.
Figure 5:
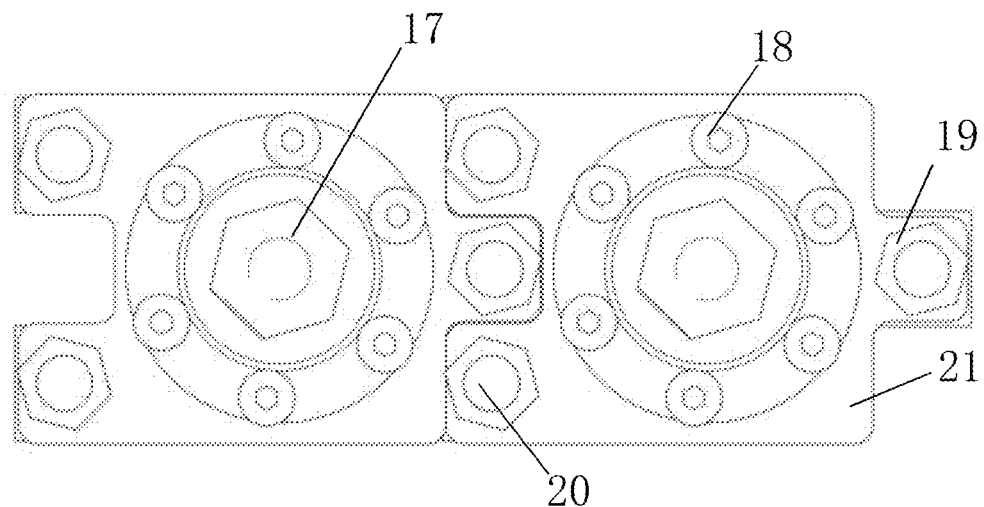
FIG. 5 shows the assembly of two high-energy sound beam excitation units according to an embodiment of the present disclosure in a top view.
Figure 6:
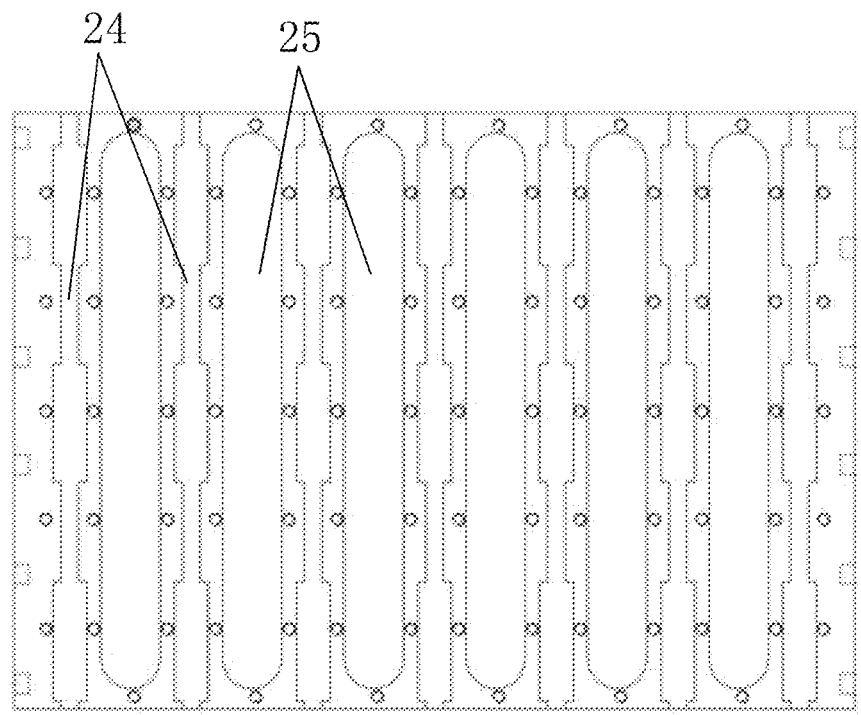
FIG. 6 is a schematic diagram of a cross plate structure of a self-adaptive additive manufacturing workbench according to an embodiment of the present disclosure.

Based on the low-stress self-adaptive manufacturing device shown in FIG. 1, a corresponding multi-source self-adaptive low-stress additive manufacturing method as shown in FIG. 2 is provided, and the method includes the following steps A to E.

At step A, a residual stress distribution of the metal workpiece to be additive manufactured is analyzed according to the size and structure of the metal workpiece, an arrangement scheme of high-energy sound beam excitation unit(s) is formulated based on the residual stress distribution and the size of the workpiece to determine the number and mounting position(s) of the high-energy sound beam excitation unit(s) therefrom, corresponding one or more high-energy sound beam excitation units are arranged on an additive manufacturing platform to construct a high-energy sound beam regulation system, and a residual stress regulation system is formulated.

The one or more high-energy sound beam excitation units slide below the metal workpiece to be additive manufactured through a T-shape groove of the self-adaptive additive manufacturing workbench. The high-energy sound beam unit(s) is connected with titanium alloy special adiabatic amplitude transformer(s) via a coaxial screw rod, and the top portion(s) of the titanium alloy special adiabatic amplitude transformer(s) abuts against a side of the substrate on which the additive manufacturing is not conducted, so that the high-energy sound beam(s) is transmitted into the metal workpiece to be additive manufactured from the high-energy sound beam excitation unit(s).

The one or more high-energy sound beam excitation units are driven by the multichannel high-energy sound beam generator. The multichannel high-energy sound beam generator can simultaneously control the enabling and power of a plurality of high energy sound beam excitation units, and can separately control the time sequence of the plurality of high energy sound beam excitation units through the industrial personal computer.

At step B, an additive path is planed according to the size and the structure of the metal workpiece.

At step C, a substrate is fixed on a self-adaptive additive manufacturing workbench, and the substrate is polished and cleaned.

At step D, additive manufacturing of the metal workpiece is conducted and the high-energy sound beam regulation system is started synchronously to inject the high-energy sound beam(s) into the inside of the metal workpiece according to a time and/or space control sequence.

At step E, position information of molten pool(s) and position information of the high-energy sound beam excitation unit(s) are acquired in the additive manufacturing process in real time.

In the process of additive manufacturing, the position(s) of the molten pool(s) is close to the position(s) of the distal end(s) of the welding torch(es).

The industrial personal computer reads the position data $(x_{r1}, y_{r1}, z_{r1})$ of the distal end(s) of the welding torch(es) held by the manipulator(s) from the respective manipulator controller(s) in real time.

The industrial personal computer performs centralized control on the high-energy sound beam generator, and adjusts the state information of the high-energy sound beam generator in real time based on the real-time position information of the molten pool(s), so as to generate time sequence logic for regulating the whole process. The state information of the high-energy sound beam generator mainly comprises enabling information and power information of the high-energy sound beam generator.

In the regulation process, the industrial personal computer monitors and records the coordinate data $(x_{r1}, y_{r1}, z_{r1})$ of the distal end(s) of the welding torch(es) held by the respective manipulator(s) in the additive manufacturing process in real time so as to obtain the position information of the molten pool(s), and adjusts the enabling condition and the power information of the high-energy sound beam generator according to the position(s) of the molten pool(s). According to the horizontal position data $(x_{rm}, y_{rm})$ of the respective welding torch(es) in the Cartesian coordinate system and the position $(x_n, y_n)$ of the respective high-energy sound beam excitation unit(s), $\Delta L_{(x,y)_n} = \sqrt{(x_n-x_{rm})^2+(y_n-y_{rm})^2}$ is calculated. The switching condition of the respective high-energy beam excitation unit(s) is adjusted based on the size of $\Delta L_{(x,y)_n}$. According to the vertical height data $z_{rm}$ of the respective welding torch(es) in the Cartesian coordinate system and the vertical position data $z_n$ of the respective high energy sound beam excitation unit(s), $\Delta L_{hn}$ is calculated to adjust the power range $0 \sim W_n$ of the respective high energy sound beam excitation unit(s). If there are high-energy sound beam excitation unit(s) arranged below or near the position(s) of the molten pool(s), the high-energy sound beam excitation unit(s) below this position is closed, the nearby excitation unit(s) is adjusted to work at low power, while the high-energy sound beam excitation units at the other positions regulate at high power. With the increase of the number of additive layers and the elevation of the molten pool(s) in the vertical direction, the power of the high-energy beam excitation unit(s) is increased.

The industrial personal computer reads the coordinate data of the distal end(s) of the welding torch(es) held by the manipulator(s) and feeds the coordinate data back to the regulation system. The system feeds back and regulates the high-energy sound beam generator to realize that the high-energy sound beams are reflected to the area to be regulated of the workpiece in a uniform and lossless manner.

At step F, the surface temperature of the metal workpiece is continuously monitored when the additive manufacturing of the metal workpiece starts.

At step G, the high-energy sound beam regulation system is closed when the additive manufacturing of the metal workpiece is finished and the surface temperature of the metal workpiece is reduced to the room temperature.

Through the steps described above, the residual stress is regulated in the additive manufacturing process, the position of each molten pool is acquired in real time, the industrial personal computer adjusts the enabling and power of the high-energy sound beams in a multi-channel self-adaptive mode based on the relative distance between each high-energy sound beam excitation unit and the molten pool, the residual stress of the workpiece is reduced and homogenized without affecting the solid solution process of the molten pool, and the mechanical property of the workpiece and the reliability of the additive manufacturing are improved.

Figure 7:
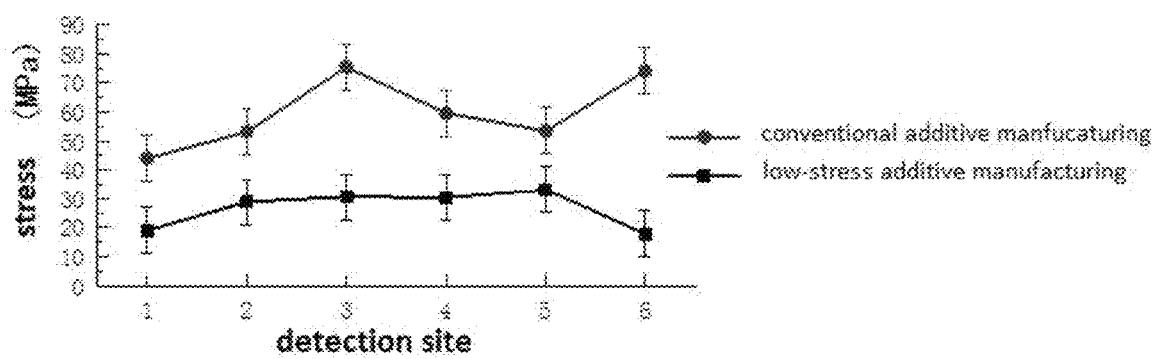
FIG. 7 shows the comparison of residual stress detection results of the metal workpiece prepared with the same metal by conventional and low-stress additive manufacturing.

As shown in FIG. 7, residual stress detection results of the metal workpiece prepared with the same metal ZL1 14A wire by conventional and low-stress additive manufacturing are compared. It is clear from the graph that the residual stress of the metal workpiece manufactured by the method and the device of the present disclosure is significantly reduced at each point, indicating that the method and the device of the present disclosure is effective in eliminating residual stress.

It should be noted that the embodiments described in the present disclosure are only a part of the embodiments of the application, and not all of the embodiments. The components of the embodiments of the present disclosure, as generally described and illustrated in the figures herein, may be arranged and designed in a wide variety of different configurations. Thus, the above detailed description of the embodiments of the present disclosure, as provided in the annexed drawings, is not intended to limit the scope of the disclosure, but merely representative of selected embodiments of the disclosure. All other embodiments, which can be derived by those skilled in the art from the embodiments of the present disclosure without making any creative effort, shall fall within the protection scope of the present disclosure.

The terms first, second, third, or module A, module B, module C, or the like in the specification and the claims, may be used solely to distinguish one from another and are not intended to imply a particular order to the objects, but rather are to be construed in a manner that allows interchanging particular sequences or orderings where appropriate so that embodiments of the present disclosure may be practiced otherwise than as specifically illustrated or described herein.

In the above description, the labels involved to represent the steps do not necessarily indicate that they will be performed in that order, and may include intermediate steps or be replaced by other steps, and the order of the previous and subsequent steps may be interchanged or performed simultaneously where appropriated.

The term "comprising" as used in the specification and claims should not be construed as being limited to the items listed thereafter; it does not exclude other elements or steps. It shall, therefore, be interpreted to specify the existence of the said features, objects, steps or parts referred to, without excluding the existence or addition of one or more other features, objects, steps or parts and the group thereof. Thus, the expression "an apparatus comprising a device A and a device B" should not be limited to an apparatus consisting of a device A and a device B.

Reference in the specification to "one embodiment" or "an embodiment" means that a particular feature, structure, or characteristic described in connection with the embodiment is included in at least one embodiment of the disclosure. Thus, the phrases "in one embodiment" or "in an embodiment" in various places throughout this specification are not necessarily all referring to the same embodiment, but may. Furthermore, in various embodiments of the present disclosure, unless otherwise specified or conflicting, terms and/or descriptions between different embodiments have consistency and may be mutually referenced, and technical features in different embodiments may be combined to form new embodiments according to their inherent logical relationships.

It is noted that the foregoing is only illustrative of the preferred embodiments of the present disclosure and the technical principles employed.

Those skilled in the art will appreciate that the present disclosure is not limited to the particular embodiments described herein, and that various obvious changes, rearrangements and substitutions will now be apparent to those skilled in the art without departing from the scope of the disclosure. Therefore, although the present disclosure has been described in more detail with reference to the above embodiments, the present disclosure is not limited to the above embodiments, and may include other equivalent embodiments without departing from the spirit of the present disclosure.

What is claimed is:

1. A multi-source self-adaptive low-stress additive manufacturing method, comprising:
   formulating an arrangement scheme of a high-energy sound beam excitation unit based on a size and a structure of a metal workpiece to be prepared, and arranging corresponding one or more high-energy sound beam excitation units on an additive manufacturing platform;
   planning an additive path according to the size and the structure of the metal workpiece;
   fixing a substrate on a self-adaptive additive manufacturing workbench, and polishing and cleaning the substrate;
   conducting additive manufacturing of the metal workpiece and starting a high-energy sound beam regulation system synchronously to generate high-energy sound beam(s) which transmitted to the metal workpiece according to a time and/or space control sequence;
   acquiring position information of molten pool(s) and position information of the one or more high-energy sound beam excitation units in an additive manufacturing process in real time, of which position information of the molten pool(s) is acquired based on the position information of distal end(s) of welding torch(es), calculating a relative distance between the molten pool(s) and the one or more high-energy sound beam excitation units according to the position information of the molten pool(s) and the position information of the one or more high-energy sound beam excitation units, and regulating and controlling enabling condition and power information of the one or more high-energy sound beam excitation units according to the relative distance;

wherein the industrial personal computer monitors and records the coordinate data $(x_{r1}, y_{r1}, z_{r1})$, $(x_{r2}, y_{r2}, z_{r2})$ of the distal end(s) of the welding torch(es) held by respective manipulator(s) in the additive manufacturing process in real time so as to obtain the position information of the molten pool(s), and adjusts the enabling condition and the power information of the one or more high-energy sound beam excitation units according to the of the position(s) molten pool(s), $\Delta L_{(x,y)_n} = \sqrt{(x_n-x_{rm})^2+(y_n-y_{rm})^2}$ is calculated according to the horizontal position data $(x_{rm}, y_{rm})$ of the respective welding torch(es) in the Cartesian coordinate system and the position $(x_n, y_n)$ of the respective high-energy sound beam excitation unit(s), a switching condition of the respective high-energy beam excitation unit(s) is adjusted based on the size of $\Delta L_{(x,y)_n}$, a power range $0 \sim W_n$ of the respective high energy sound beam excitation unit(s) is adjusted based on $\Delta L_{hn}$ which is calculated according to vertical height data $z_{rm}$ of the respective welding torch(es) in the Cartesian coordinate system and vertical position data $z_n$ of the respective high energy sound beam excitation unit(s);

continuously monitoring a surface temperature of the metal workpiece when the additive manufacturing of the metal workpiece starts; and closing the high-energy sound beam regulation system when the additive manufacturing of the metal workpiece is finished and the surface temperature of the metal workpiece is reduced to room temperature;

wherein the one or more high-energy sound beam excitation units further include titanium alloy special adiabatic amplitude transformer(s); and wherein the titanium alloy special adiabatic amplitude transformer(s) is ¼ wavelength titanium alloy special adiabatic amplitude transformer(s) or ½ wavelength titanium alloy special adiabatic amplitude transformer(s) depending on the size of a space for the additive manufacturing.

2. The method of claim 1, wherein a frequency range of high energy sound beam(s) emitted by the one or more high-energy sound beam excitation units is 5.0-40.0 KHz, and the power of a single high-energy sound beam excitation unit is more than 1.0 W.

3. The method of claim 1, wherein the titanium alloy special adiabatic amplitude transformer(s) is kept closely fitted with a side of the substrate that is not occupied by the additive manufacturing process, and heat-resisting sound-transmitting rubber or heat-resisting butter are used for coupling between the titanium alloy special adiabatic amplitude transformer(s) and the side of the substrate.

4. The method of claim 1, wherein the arrangement scheme of the high-energy sound beam excitation unit in the step A comprises the number and the position of the one or more high-energy sound beam excitation units;

when a diameter of a contact surface of the metal workpiece and the substrate is less than or equal to 100 mm, one high-energy sound beam excitation unit is arranged at an additive manufacturing position on the additive manufacturing platform;

when the diameter of the contact surface of the metal workpiece and the substrate is larger than 100 mm and the metal workpiece is a box in structure, a plurality of high-energy sound beam excitation units that are arranged in an annular or rectangular array, are arranged at additive manufacturing positions on the additive manufacturing platform;

when the diameter of the contact surface of the metal workpiece and the substrate is larger than 100 mm and the metal workpiece is a tubular or a frame in structure, a plurality of high-energy sound beam excitation units that are arranged in an annular frame or a rectangular frame according to a shape of the metal workpiece, are arranged at additive manufacturing positions on the additive manufacturing platform.

5. The method of claim 1, wherein the high-energy sound beam regulation system further has an automatic shutdown function, and when the surface temperature of the metal workpiece is reduced to room temperature, the automatic shutdown function is turned on and the high-energy sound beam regulation system stops working automatically.

6. The method of claim 1, wherein the surface temperature of the metal workpiece is represented by the surface temperature of a side of the substrate on which the additive manufacturing is conducted.

7. The method of claim 1, further comprising recording and storing an additive manufacturing and regulating scheme after the additive manufacturing process and the regulation process are finished.

* * * * *